United States Patent
Schueren

(10) Patent No.: US 7,237,523 B2
(45) Date of Patent: Jul. 3, 2007

(54) INTERNAL COMBUSTION ENGINE WITH AT LEAST TWO CYLINDER BANKS

(75) Inventor: Peter Schueren, Krefeld (DE)

(73) Assignee: International Engine Intellectual Property Company, LLC, Warrenville, IL (US)

( * ) Notice: Subject to any disclaimer, the term of this patent is extended or adjusted under 35 U.S.C. 154(b) by 116 days.

(21) Appl. No.: 10/973,487

(22) Filed: Oct. 26, 2004

(65) Prior Publication Data

US 2005/0115240 A1 Jun. 2, 2005

(30) Foreign Application Priority Data

Oct. 28, 2003 (DE) .................. 103 50 133

(51) Int. Cl.
*F02M 35/10* (2006.01)
*F02B 33/44* (2006.01)

(52) U.S. Cl. .................. 123/184.31; 60/612

(58) Field of Classification Search .......... 123/184.28, 123/184.29, 184.31–184.36, 559.1, 568.13, 123/568.15

See application file for complete search history.

(56) References Cited

U.S. PATENT DOCUMENTS

| | | | |
|---|---|---|---|
| 2,073,871 A * | 3/1937 | Kliesrath | 123/198 R |
| 4,630,592 A | 12/1986 | Larabie | |
| 4,878,460 A * | 11/1989 | Uchida et al. | 123/563 |
| 5,016,579 A * | 5/1991 | Suzuki et al. | 123/184.35 |
| 5,170,754 A * | 12/1992 | Urabe | 123/184.31 |
| 5,762,051 A * | 6/1998 | Okamoto | 123/568.18 |
| 6,755,169 B2 * | 6/2004 | Storz | 123/184.21 |

FOREIGN PATENT DOCUMENTS

| | | | |
|---|---|---|---|
| DE | 4014291 A1 | * | 11/1991 |
| EP | 0 722 042 A3 | | 7/1996 |
| JP | 64000314 A | * | 1/1989 |
| JP | 01117921 A | * | 5/1989 |

* cited by examiner

*Primary Examiner*—Stephen K. Cronin
*Assistant Examiner*—Hyder Ali
(74) *Attorney, Agent, or Firm*—Dennis K. Sullivan; Susan L. Lukasik; Jeffrey P. Calfa

(57) ABSTRACT

An intake air crossover arrangement for an internal combustion engine having two cylinder banks in a V-shaped arrangement in which air compressed by at least one, and preferably two, turbochargers, is delivered via air ducts to respective intake manifolds for each cylinder bank wherein the air ducts twist at least in the crossover region and have a cross-sectional shape such that they sit in flat contact with one another, preferably by use of an integrally formed crossover pipe containing portions of both ducts. The crossover pipe may further include integral connections for exhaust gas recirculation respectively for each duct.

17 Claims, 2 Drawing Sheets

INTERNAL COMBUSTION ENGINE WITH AT LEAST TWO CYLINDER BANKS

TECHNICAL FIELD OF THE INVENTION

The invention relates to an internal combustion engine of the type having at least two banks of cylinders, in particular a diesel engine disposed in a V-shaped arrangement, to which compressed air can be delivered by means of at least one supercharger, in particular a turbocharger, and introduced via air ducts into the respective intake manifolds on each of the cylinder banks, it being optionally possible to cool the air delivered through the air ducts by means of a charge air cooler, and wherein the air ducts cooperating with the respective cylinder banks cross over each other.

BACKGROUND OF THE INVENTION

Being high-power automotive engines, internal combustion engines of this type are widely used in practice. The power of the internal combustion engine is increased by supercharging, i.e. by compressing the fresh air before it enters the cylinder. However, this compression stage simultaneously causes the charge air to become hot, thus exposing the internal combustion engine to thermal stress. It also has a detrimental effect on the exhaust gas temperature and hence on $NO_x$ emissions and fuel consumption. For this reason, the air delivered to the cylinder banks is cooled before it enters the intake manifolds as a rule, which can be done using external air or alternatively the engine coolant as the cooling means. A charge air cooler is often provided for this purpose. In many cases, the dwell time of the air in the air ducts is often used as a means of improving the cooling effect. To this end, particularly where two turbochargers are used, the turbocharger on the right side may be used to exclusively charge the cylinders on the left side and vice versa, resulting in extended length of the air ducts and therefore cross over on their respective paths between the turbochargers and their respective cylinder banks.

It is also known to recirculate the exhaust gas, which is an effective way of reducing NOx emissions. This being the case, a part of the exhaust gas from the cylinders is recirculated into the fresh air delivery. To ensure that the exhaust gas is mixed with the fresh air as efficiently possible there, the proportion of exhaust gas is not introduced directly into the intake manifold of a cylinder bank and instead is introduced into the air ducts at a certain distance upstream. This provides a mixing run of a specific length.

The disadvantage of these known internal combustion engines, however, is that the layout of the two air ducts assigned to the respective cylinder banks requires a considerable amount of fitting space inside the engine compartment of the motor vehicle. One particular reason for this is the fact that these air ducts cross over and therefore have to be run past one another, which means that they require a proportion of the compartment volume that is at least more than double that of a single air duct. In addition, this configuration of the air ducts also means that the respective connectors to or the turbochargers on the cylinder banks are disposed in differing positions.

These problems are further exacerbated if an exhaust gas recirculation system is provided, requiring appropriate connecting lines to be accommodated in the engine compartment, but these are not of an identical design as a rule because they connect into the air ducts at mutually offset points.

SUMMARY OF THE INVENTION

Accordingly, the underlying objective of the invention is to improve an internal combustion engine so that it requires less space without incurring a loss in power.

This objective is achieved by means of an internal combustion engine incorporating the features of the claim. It is distinctive in particular due to the fact that the air ducts are disposed so that they twist at least in the crossover region and their cross-section is such that they sit in contact with one another in a flat arrangement.

Consequently, for the first time, the air ducts do not simply run past one another, but twist or turn at least in the crossover region, thereby eliminating the space between them. This feature is further optimised due to the fact that the air ducts are designed with a mutually adapted cross-sectional shape so that they sit in contact with one another in a flat arrangement. Accordingly, the two air ducts can be disposed in a very compact mutual arrangement without having to make any reductions in the effective flow cross-section.

The space needed for the air ducts as a result of the invention is therefore significantly less than that required in the prior art. However, this arrangement also brings other significant advantages:

For example, this twisted design of the air ducts means that the respective connectors on the intake manifolds of the cylinder banks and on the charger can be disposed so that they sit in an essentially symmetrical or identical orientation on the internal combustion engine. This also saves on space. Furthermore, the internal combustion engine may be of a less complex design, thereby obviating the need for abrupt changes in the direction of the ducts which have a detrimental effect on flow properties or on the production process.

The mutual flat contact of the air ducts in the crossover region also improves cooling of the delivered air because circulation through the two air ducts is in counter-flow. This leads to temperature adaptation occurring between the ducts, which is also of particular advantage in terms of operating the cylinders uniformly.

Advantageous embodiments of the internal combustion engine proposed by the invention are defined in the dependent claims.

For example, the air ducts may each have an essentially semi-circular cross-section, at least in the crossover region, and may be disposed in a twisting arrangement so that, together, they form an essentially circular cross-sectional shape at the external circumference. A design of this type has the particular advantage of providing an extremely compact structure with good flow cross-sections, requiring only a very small amount of fitting space. Furthermore, a very large contact surface is obtained, resulting in a very effective heat exchange and hence a good adaptation of the temperature of the respective air flows therethrough.

It is also of advantage if the air ducts each have connectors for lines in order to recirculate the exhaust gas and these connectors are disposed in the crossover region of the air ducts. First of all, this effectively means that the internal combustion engine proposed by the invention also has the advantages of an exhaust gas recirculation system. Secondly however, it also provides long mixing runs for mixing the recirculated exhaust gases with the fresh air uniformly, so that the subsequent combustion process in the engine can proceed under optimum conditions. The fact that the air ducts twist about the imaginary central axis of the air duct system leads to a vortex effect in the air flow, so that the recirculated exhaust gas and fresh air are mixed with one another in a particularly thorough manner.

This being the case, it is of particular advantage if the connectors are spaced apart from one another in a symmetrical arrangement with respect to the crossover point of the air ducts on the same side of the twisted air ducts. This means that the lines for the exhaust gas recirculation may be of an essentially identical design because, unlike the approach used in the prior art, the air ducts are already disposed in a way which enables them to be connected in an identical manner. In this respect, care should be taken to ensure that the air ducts lie on either side of the crossover point in such a way that the air duct for the left-hand cylinder block and the air duct on the other side for the right-hand cylinder block lie circumferentially at the bottom so that the connectors for the exhaust gas recirculation can also be run into the air ducts in an identical manner from underneath, in other words from the same side. This reduces the complexity of the structure of the internal combustion engine proposed by the invention. Furthermore, the complexity involved in manufacturing the lines for the exhaust gas recirculation system in particular is significantly reduced. There is also more constructive freedom in terms of the layout of components on the internal combustion engine, which again saves on mounting space or optimises the use of mounting space.

If the two air ducts are of a mutually integral design, the effort in involved in assembling these components of the internal combustion engine is further reduced because the number of parts is reduced. Furthermore, the structural design is particularly compact as a result and saves on space.

BRIEF DESCRIPTION OF THE DRAWINGS

The internal combustion engine proposed by the invention will be explained in more detail below, with reference to examples of embodiments illustrated in the appended drawings. Of these.

DESCRIPTION OF THE PREFERRED EMBODIMENT

Figure 1:
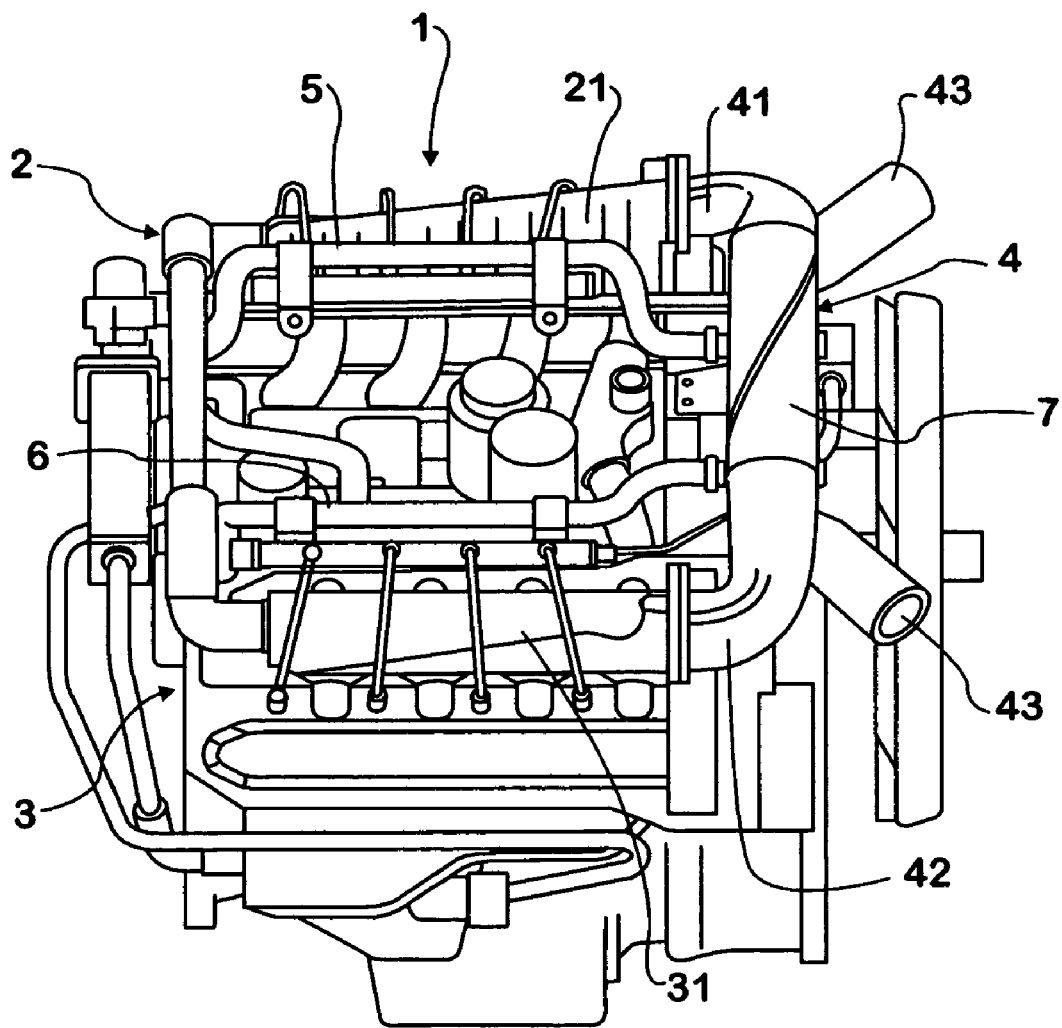
FIG. 1 is a perspective diagram of the internal combustion engine proposed by the invention.

FIG. 1 shows a perspective diagram of an internal combustion engine 1, looking onto the engine from above at an angle. The internal combustion engine 1 preferably is a diesel engine having two cylinder banks 2 and 3 disposed in a V-shaped arrangement relative to one another, which are of a conventional design as such. However, the invention is also applicable to spark-ignited gasoline engines. Only those components of the internal combustion engine 1 that are specially adapted for the purpose of the invention will be described in detail below; all other components essentially correspond to the elements of a conventional internal combustion engine.

The cylinder banks 2 and 3 have intake manifolds 21 and 31, to which air is delivered by means of an air duct system 4, for the combustion process in the internal combustion engine 1. To this end, the air duct system 4 has an air duct 41 exclusively for the left-hand cylinder block 2 and an air duct 42 exclusively for the right-hand cylinder block 3, viewed respectively in the direction of travel of the motor vehicle. The air ducts 41 and 42 each have identically designed turbocharger connections 43, by means of which they are each connected to a turbocharger (not shown). The two turbochargers compress the fresh air arriving through an air filter and deliver it into the respective ducts 41 and 42 and hence into the intake manifolds 21 and 31.

As may be seen from the drawings, the two air ducts 41 and 42 are twisted in a crossover pipe 7 forming respective portions of each of the air ducts 41 and 42. This crossover pipe 7 is illustrated in more detail in FIG. 2.

Figure 2:
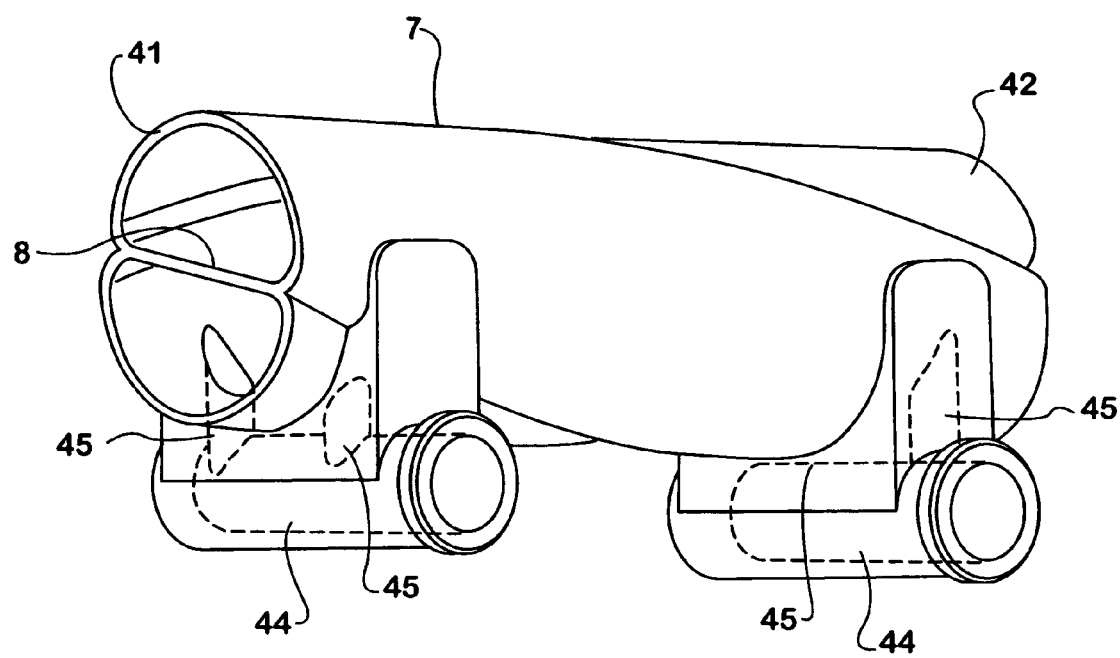
FIG. 2 is a perspective diagram showing a detail of the crossover region of the air ducts.

As may be seen from the section shown in FIG. 2, within the crossover pipe 7 the air ducts 41 and 42 each have an essentially semi-circular cross-section and are integrally constructed so that they have a common connecting wall 8 forming the base of the semi-circular cross-sections. The air ducts 41 and 42 therefore sit in flat contact with one another in this region. The air duct system 4 also turns or twists and the turn axis is an imaginary central axis through the circumferential cross-section of the full circle formed by the air ducts 41 and 42.

As may be seen more particularly from FIG. 1, this mutual twisting of the air duct system 4 enables each of the associated air ducts 41 and 42 to be disposed respectively on the top side of the crossover pipe 7 relative to the engine in the region of the intake manifolds 21 and 31 for convenient connection thereto. Each of the turbocharger connections 43 to the associated air ducts 41 and 42, on the other hand, are disposed respectively on the bottom side of the crossover pipe 7 for convenient connection thereto.

The internal combustion engine 1 also incorporates exhaust gas recirculation lines 5 and 6, by means of which part-flows are drawn off from the exhaust gas in the exhaust gas system of the motor vehicle and delivered to the air duct system 4. The exhaust gas recirculation lines 5 and 6 are therefore arranged so that they recirculate the exhaust gas back to the respective air duct 41 or 42 of the same cylinder block 2 or 3. To this end, respective connectors 44 to the air ducts 41 and 42 are provided on the crossover pipe 7, into which the exhaust gas recirculation lines 5 and 6 open. As illustrated in the diagram shown in FIG. 2, the connectors 44 are disposed on the bottom side of the crossover pipe 7 and respectively have two connecting pipes 45, by means of which recirculated exhaust gas can be introduced into either the air duct 41 or the air duct 42.

To this end, the connectors 44 are disposed in the crossover region of the air ducts 41 and 42, arranged symmetrically with respect to the crossover point, which occupies the middle position in the symmetrically designed air duct system 4. The connectors 44 with the connecting pipe 45 are thus formed onto the crossover pipe 7.

In addition to the embodiment illustrated here, the invention permits additional design features.

For example, the air ducts 41 and 42 may also be provided as separate components, in which case the air duct system 4 is no longer of an integral design as with crossover pipe 7 but may be made up of several components. In addition, the connectors 44 with the connecting pipes 45 need not necessarily be integral with the crossover pipe and instead may be mechanically connected during the assembly process.

In other embodiments, it would also be possible for the air ducts 41 and 42 to have a cross-sectional shape other than a semi-circular shape. For example, they could also be of a triangular or rectangular design, in which case they should sit in contact with one another along a side in order to make the best possible use of the mounting space.

Mixing atomisers for the exhaust gas recirculation system may also be provided in the region of the connectors 44, which will ensure that the recirculated exhaust gases are mixed with the fresh air as homogeneously as possible.

What is claimed is:

1. In an internal combustion engine having at least two banks of cylinders disposed in a V-shaped arrangement, first and second air ducts for supplying compressed air exclusively respectively from a first intake air source and a second intake source to respective first and second intake manifolds associated with the cylinder banks, the air ducts crossing from one side of the engine to the other, the improvement wherein the air ducts twist relative to each other about an axis parallel to a longitudinal axis of one of said first and second ducts at least in the crossover region and have a cross-sectional shape such that they sit in flat contact with one another.

2. The internal combustion engine as claimed in claim 1 and a crossover pipe having portions of the two air ducts integrally incorporated therein.

3. The internal combustion engine as claimed in claim 2 the two air ducts having a common wall within the crossover pipe.

4. The internal combustion engine as claimed in claim 2 wherein the air ducts respectively have an essentially semi-circular cross-section within the crossover pipe and twist in such a way that together, they form an essentially circular cross-sectional shape at the outer circumference thereof.

5. The internal combustion engine as claimed in claim 2 wherein the air ducts respectively have connectors for lines for recirculating exhaust gas and the connectors are disposed in the crossover pipe.

6. The internal combustion engine as claimed in claim 1, wherein the air ducts respectively have an essentially semi-circular cross-section at least in the crossover region and twist in such a way that, together, they form an essentially circular cross-sectional shape at the outer circumference.

7. The internal combustion engine as claimed in claim 1 wherein the air ducts respectively have connectors for lines for recirculating exhaust gas and the connectors are disposed in the crossover region of the air ducts.

8. The internal combustion engine as claimed in claim 7 wherein the connectors are spaced apart on the same side of the twisted air ducts in a symmetrical arrangement with respect to a crossover point of the air ducts.

9. The internal combustion engine as claimed in claim 7 wherein the compressed air is supplied respectively to the ducts by two turbochargers.

10. A charge air system for an internal combustion engine of V-shaped configuration, each bank of said engine having an intake manifold comprising:
    a first air duct fluidly connected to a first intake air source to supply charge air exclusively at all times from the first intake air source to the intake manifold of one bank of cylinders;
    a second air duct fluidly connected to a second intake air source to supply charge air exclusively at all times from the second intake air source to a second bank of cylinders; and
    a crossover pipe in which portions of the first air duct and the second air duct are integrally incorporated wherein the air ducts respectively have an essentially semi-circular cross-section within the crossover pipe and twist about a longitudinal axis in such a way that, together, they form an essentially circular cross-sectional shape at the outer circumference thereof.

11. The internal combustion engine as claimed in claim 10 wherein the two air ducts have a common wall within the crossover pipe.

12. The internal combustion engine as claimed in claim 10 wherein the air ducts respectively have connectors for lines for recirculating exhaust gas and the connectors are disposed in the crossover pipe.

13. The internal combustion engine as claimed in claim 12 wherein the connectors are spaced apart on the same side of the twisted air ducts in a symmetrical arrangement with respect to a crossover point of the air ducts.

14. A crossover pipe for use an internal combustion engine of V-shaped configuration, each bank of said engine having an intake manifold and an air duct fluidly connected thereto to supply charge air from an exclusive air source to such intake manifold, comprising:
    an integral body incorporating separated portions of the air ducts for each bank, said air ducts having a common wall within the crossover pipe, the air ducts respectively twisting relative to each other about a central longitudinal axis of the crossover pipe.

15. The internal combustion engine as claimed in claim 14 wherein the air ducts respectively have an essentially semi-circular cross-section within the crossover pipe and twist in such a way that, together, they form an essentially circular cross-sectional shape at the outer circumference thereof.

16. The internal combustion engine as claimed in claim 14 wherein the air ducts respectively have connectors for lines for recirculating exhaust gas and the connectors are disposed in the crossover pipe.

17. The internal combustion engine as claimed in claim 16 wherein the connectors are spaced apart on the same side of the twisted air ducts in a symmetrical arrangement with respect to a crossover point of the air ducts.

* * * * *